(12) United States Patent
Boss et al.

(10) Patent No.: US 7,962,955 B2
(45) Date of Patent: Jun. 14, 2011

(54) PROTECTING USERS FROM MALICIOUS POP-UP ADVERTISEMENTS

(75) Inventors: Gregory J. Boss, American Fork, UT (US); Gang Chen, Oceanside, NY (US); Rick A. Hamilton, II, Charlottesville, VA (US); John S. Langford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 11/464,581

(22) Filed: Aug. 15, 2006

(65) Prior Publication Data
US 2008/0046975 A1 Feb. 21, 2008

(51) Int. Cl.
*G06F 11/00* (2006.01)
(52) U.S. Cl. .......... 726/22; 713/152; 715/700; 715/781; 715/808; 715/809; 726/4
(58) Field of Classification Search .................. 715/808, 715/809, 781, 700; 713/152; 726/22, 4
See application file for complete search history.

(56) References Cited

U.S. PATENT DOCUMENTS

| 5,535,422 A * | 7/1996 | Chiang et al. .................. 715/709 |
| 6,407,759 B1 | 6/2002 | Kanungo et al. |
| 2003/0098882 A1 * | 5/2003 | Cowden et al. ............... 345/781 |
| 2003/0098883 A1 * | 5/2003 | Pennell et al. ............... 345/781 |
| 2005/0055330 A1 * | 3/2005 | Britton et al. ..................... 707/1 |
| 2005/0066290 A1 * | 3/2005 | Chebolu et al. ............... 715/808 |
| 2005/0182924 A1 | 8/2005 | Sauve et al. |
| 2005/0198587 A1 | 9/2005 | Pennell et al. |
| 2005/0257168 A1 | 11/2005 | Cummins et al. |
| 2006/0070008 A1 * | 3/2006 | Sauve et al. .................. 715/788 |
| 2006/0179315 A1 * | 8/2006 | Sasage et al. ................. 713/173 |
| 2006/0224677 A1 * | 10/2006 | Ishikawa et al. .............. 709/206 |
| 2007/0100793 A1 * | 5/2007 | Brown et al. ..................... 707/2 |

FOREIGN PATENT DOCUMENTS

| JP | PUPA H11-242548 | 9/1999 |
| JP | PUPA 2005-292901 | 10/2005 |

OTHER PUBLICATIONS

MicroImages.Inc TNTmips 6.6 Appendices, 206 South 13th Street, 11th floor—Sharp Tower, Lincoln NE 68508, USA 2001 16 pages.*
"Best Practives: Protecting Against the Growing Threat of Phishing Scams", INET Jan. 1, 2006, INET Retrieved from the Internet: URL:http://www.ca.com/files/whitepapers/29349_phishing_whitepaper.pdf (retrieved on Aug. 31, 2010).
May 25, 2010 Japanese Office Action for Japanese Patent Application No. 2009-524165, IBM.

(Continued)

*Primary Examiner* — Taghi T Arani
*Assistant Examiner* — Jason Lee
(74) *Attorney, Agent, or Firm* — William Schiesser; Hoffman Warnick LLC

(57) ABSTRACT

The present invention is a solution for detecting a spoofed command button in a pop-up window. The solution tracks the creation process of a pop-up window, detects the presence of command buttons in the pop-up window, verifies the value labeled on each command button in the pop-up window and determines a follow-up action generated from selecting a command button on the pop-up window.

13 Claims, 5 Drawing Sheets

OTHER PUBLICATIONS

English translation of portions of the May 25, 2010 Japanese Office Action for Japanese Patent Application Number 2009-524165 that apply, discuss, or mention references from the May 25, 2010 Japanese Office Action.

Kaori Sotoma, "Quick-learning Intensive Course for Advanced Techniques for Beginners: Expert Skills in Your First-Time Homepage Creation: Lesson 3: Useful script? This is the Thing." Let's Create a Homepage with the Latest HTML. AI MOOK 199, First Edition, pp. 67-78, AI Publishing, May 30, 1998 (CSDB: Domestic Technical Journal 200001158005).

"Special Topic 2: Decryption of a Warning Message on the Web: Introduction: Practical Guide", Nikkei Network, vol. 36, pp. 55-65, Nikkei BP Inc., Mar. 22, 2003 (CSDB: Domestic Technical Journal 200400371001).

"Special Topic 2: "Netrun" is My Body Guard: Spyware: Your PC is Infected with Virus 90% of the Time: Spyware Joins Hands with a Swindler!? Here's the Most Malicious and Evil Trick." Net Runner, vol. 8, No. 9, pp. 74-77 Softbank Creative Corp. Released on Aug. 8, 2006, (CSDB: Domestic Technical Journal 200601559009).

May 25, 2010 Japanese Office Action (untranslated) for Japanese Patent Application Number 2009-524165.

English translation of portions of the May 25, 2010 Japanese Office Action for Japanese Patent Application Number 2009-524165 that apply, discuss, or mention references from the May 25, 2010 Japanese Office Action.

* cited by examiner

PROTECTING USERS FROM MALICIOUS POP-UP ADVERTISEMENTS

FIELD OF THE INVENTION

The present invention relates generally to preventing undesired effects of advertisements on the Internet. Particularly, the present invention relates to detecting any undesired follow-up action potentially triggered by selecting a command button on a pop-up advertisement window on a web browser during an online session. More particularly, the present invention relates to the prevention of an undesired follow-up action triggered by closing such a pop-up window.

BACKGROUND OF THE INVENTION

In a typical online session on the Internet, a user will encounter pop-up windows advertising all possible kinds of products and services. These advertisements usually "pop-up" in a separate window on top of the current web browser window. Some pop-up advertisements are harmless and can be easily closed with the click of a command button provided as part of the pop-up window. However, other pop-up windows may provide a command button that is spoofed. The spoofed command button may trigger a hidden action like installing "spyware", "adware", stealing computer cycles, sending spam via the user's computer or other undesirable applications. FIG. 3 is an example of a pop-up window appearing to warn of adware or spyware, but may itself have spoofed buttons that would install a malicious program irrespective of whether the "Yes" or "No" button is selected. Although pop-up advertisements may have a system-supplied "Cancel" button that cannot be spoofed, namely the "X" button on the corner of a window, such a system-supplied button can be grayed-out, concealed or disabled. Some users may not know the difference between an explicit command button and a system-supplied "Cancel" button. There are also other pop-up windows that do not provide any command buttons to close the pop-up window other than affirmative command buttons like "Yes" or "Confirm" buttons. FIG. 4 is an example of such a pop-up window. This restricts user options to close the pop-up window, which would inevitably trigger possible undesirable follow-up actions unknown to the user. In attempting to close such malicious pop-up windows, a computer user risks authorizing a malicious action, which the computer would take to be an action consciously made by the user.

There are efforts to provide methods to avoid malicious pop-up windows like scanning malicious program code when a user has consciously given a command to download a program, where the scanning is conducted by comparing with a pre-existing set of programs prior to downloading the program code. Other efforts provide a method to escape from a display model dialog box, generated by an error Java applet, by diverting user input from the applet to the main browser loop, and receiving user key press command to execute a close window. This prior art is directed to model dialog boxes created in the Java programming language.

Thus, there exists a need to overcome at least one of the preceding deficiencies and/or limitations of the related art.

SUMMARY OF THE INVENTION

The present invention provides a method, a system and a computer program product for detecting a spoofed command button in a pop-up window and/or forewarning the user of potential harm in selecting the spoofed command button to close the pop-up window.

A first aspect of the present invention provides a method for detecting a spoofed command button comprising: tracking a pop-up window creation process; detecting a command button created in the pop-up window; checking an assigned value of the command button; and determining a follow-up action generated on selection of the command button.

A second aspect of the present invention provides a method for detecting a spoofed command button comprising: validating a closing action of pop-up window against a web browser Application Program Interface (API) for closing a window to detect an anomaly; and alerting a user on detecting that a follow-up action generated by the user on selecting the command button fails to communicate with the web browser API.

A third aspect of the present invention provides a system for detecting a spoofed command button comprising: a component for tracking a pop-up window creation process; a component for detecting creation of a command button in the pop-up window; a component for checking an assigned value of the command button; and a component for determining a follow-up action generated on selection of the command button. The system is a computer program that can be added to an existing computer program as a plug-in, extension, agent or any means that can be applied in conjunction with a web browser.

A fourth aspect of the present invention provides a computer program stored on a machine-readable medium for detecting a spoofed command button, the computer readable program performing: tracking a pop-up window creation process; detecting a command button created in the pop-up window; checking an assigned value of the command button; and determining a follow-up action generated on selection of the command button.

A fifth aspect of the present invention provides a method for deploying an application for detecting a spoofed command button comprising: providing a computer infrastructure being operable to: track a pop-up window creation process; detect a command button created in the pop-up window; check an assigned value of the command button; and determine a follow-up action generated on selection of the command button.

BRIEF DESCRIPTION OF THE DRAWINGS

The accompanying drawings are schematic representations to illustrate a typical embodiment of the present invention and not intended to limit the principles of the invention. In the drawings, like numbering represents like elements between the drawings.

DETAILED DESCRIPTION OF THE INVENTION

Different approaches have been adopted to prevent malicious codes from executing a variety of actions, but there remains the need to provide a method to detect and alert the user of malicious code that would be installed into the computer should the user issue a command to close a pop-up window.

Figure 1:
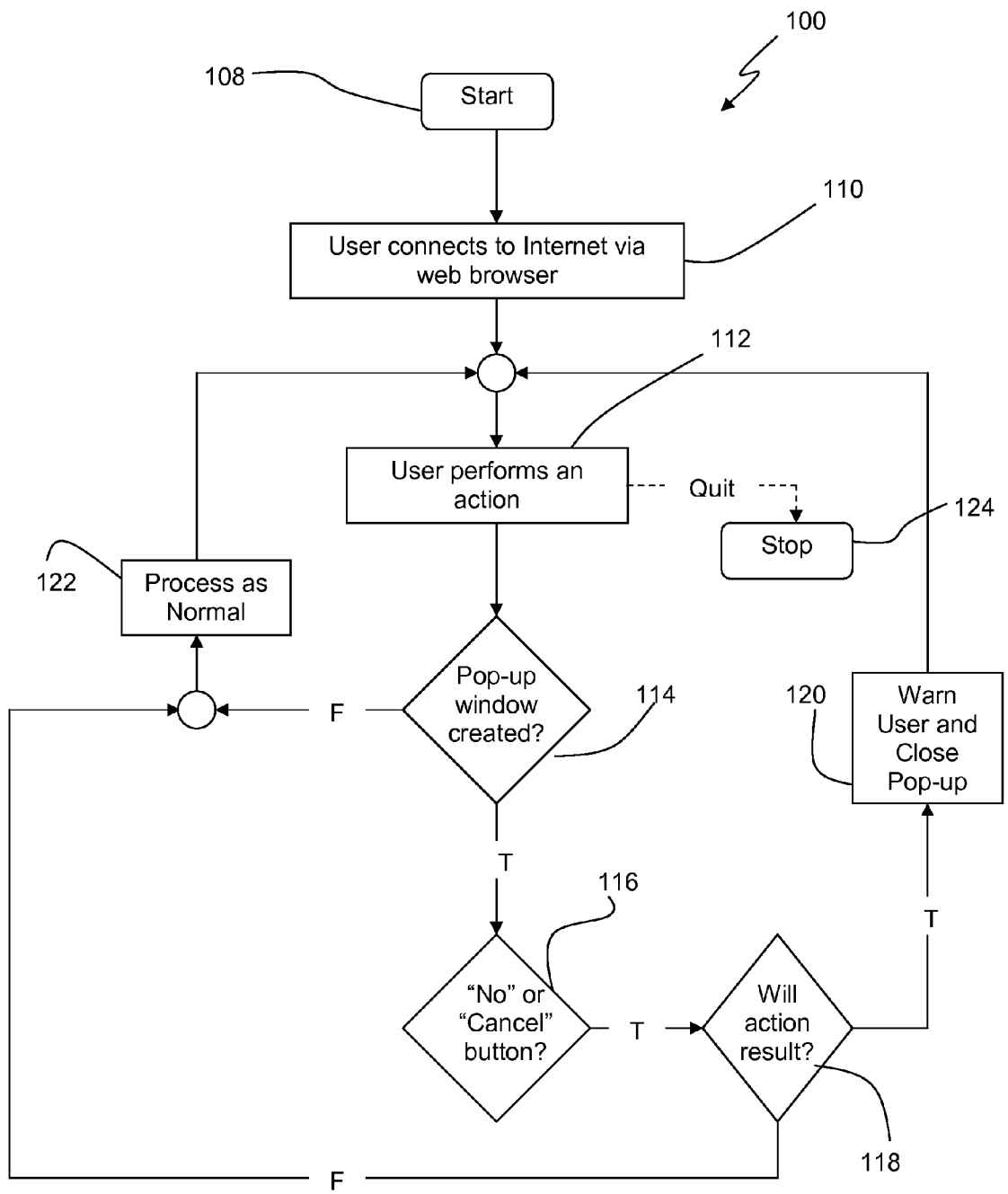
FIG. 1 is a flow chart illustrating an algorithm of one embodiment of the present invention.
Figure 3:
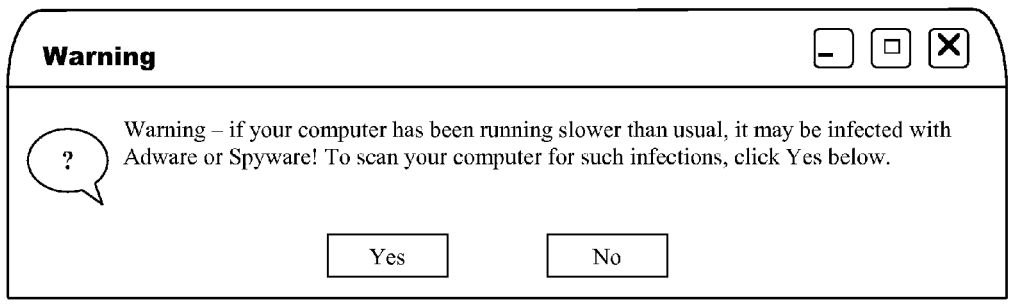
FIG. 3 is a sample pop-up window illustrating a typical advertisement providing command buttons for the user to select to close the pop-up window.
Figure 4:
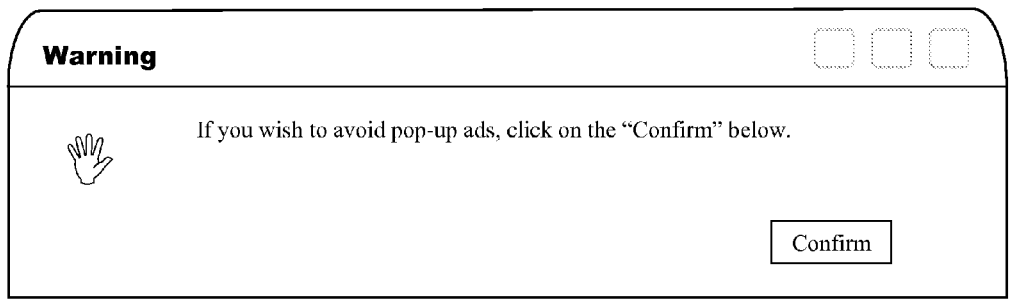
FIG. 4 is another sample pop-up window illustrating a restriction of user selection to close the pop-up window.

Turning to the Figures, FIG. 1 illustrates a process flow of an algorithm 100 for the detection of a pop-up window with a spoofed command button. A spoofed button is one where the result generated by clicking on the button does not return an expected result. The spoofed command button has the appearance of a typical command button, usually appearing in pairs (e.g. "Yes" and "No" as illustrated in FIG. 3) on a pop-up window. A user would be led to believe that such a command button provides an avenue for issuing a desired command by simply clicking on the button. However, a different action may be triggered on clicking on the command button in the pop-up window. The algorithm 100 is on stand-by 110 upon connection to the Internet via a web browser from the start 108. When a user performs an action 112 during the online session on the Internet, the algorithm 100 tracks a call to open a window (e.g. "window.open" in Java) to determine 114 if a pop-up window is being created. The algorithm 100 includes a step 116 to detect if a command button is created as part of the pop-up window by conducting a background page source code validation. The value of the command button is compared to the value of a "No" or "Cancel" button. Where the value matches, a further check 118 is conducted to determine if the follow-up action is simply "return false" (e.g. close the window without performing any other action) on clicking the command button. If so, the follow-up action is processed 122 without any interruption. If, however, the follow-up action is not "return false", the user will be alerted of the spoofed command button and the pop-up window will be closed 120 automatically by the system. This safeguards the user from clicking on the spoofed button and hence minimizes the risk of triggering malicious follow-up actions associated with clicking of the spoofed button. The algorithm 100 is then reset to be on stand-by again in anticipation of another user action that will trigger creation of a new pop-up window creation. If it is determined 114 that a pop-up window is not created, the algorithm 100 returns to the stand-by mode while the web browser processes the user command as desired 122. If the user elects to quit from the online session, the algorithm 100 registers the command and stops detecting the creation of pop-up windows 124.

Figure 2:
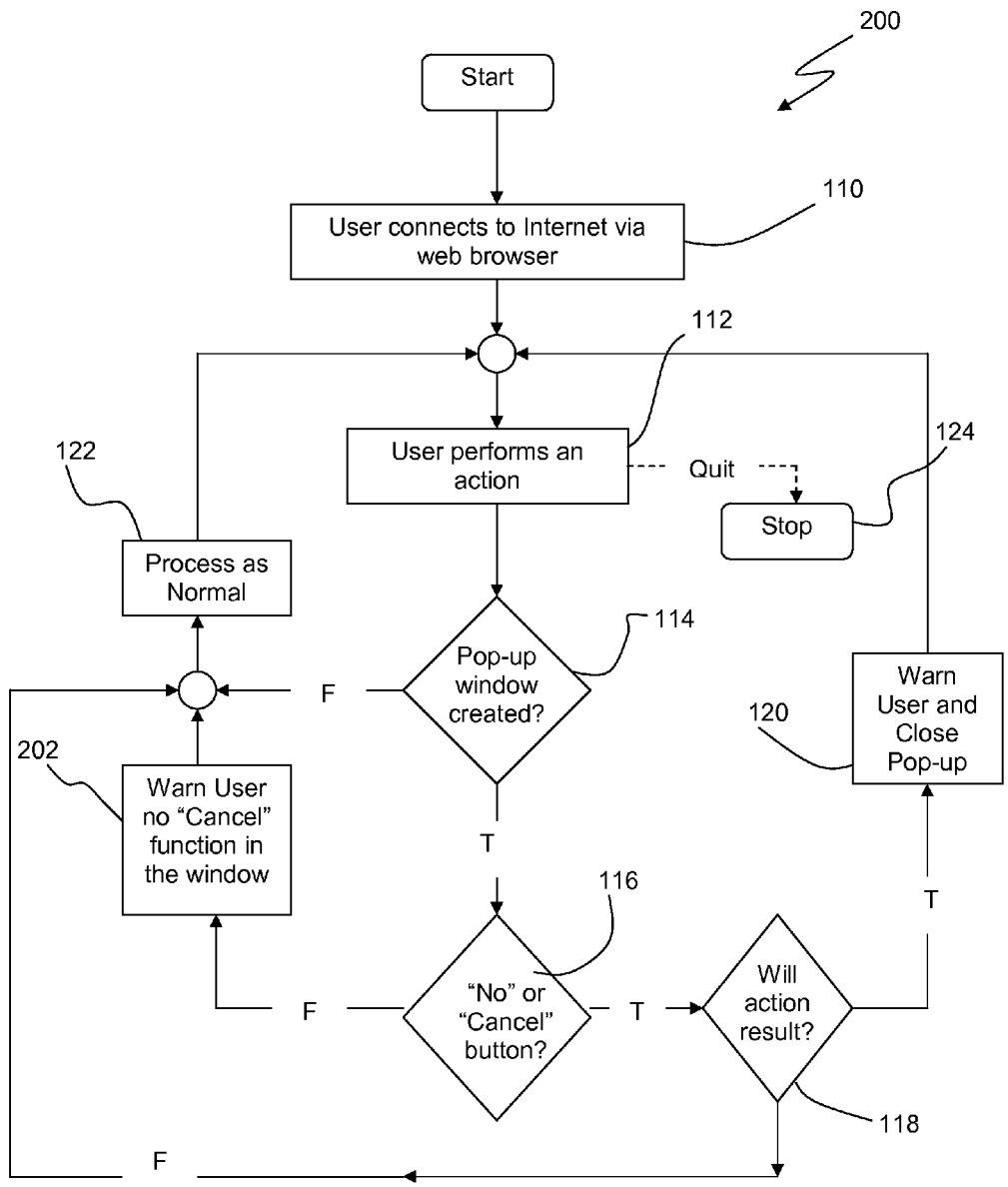
FIG. 2 is a flow chart illustrating an algorithm of an alternative embodiment of the present invention.

In FIG. 2, the algorithm 200 has, in addition to the process flow set out in the algorithm 100 in FIG. 1, an additional process flow 202 following from the logic step 116 to address the situation where a pop-up window does not provide a "Cancel" button. This essentially means that there is no command button created with a value that is comparable with the value of a "No" or "Cancel" button for closing the pop-up window. The pop-up window, however, may include a command button that restricts the user option leading to compliance and increasing the risks of triggering malicious or undesirable follow-up actions. Although the user is not given the option to close the pop-up window with a command button that would specifically perform such an action, the web browser would forewarn the user with a message like: "The pop-up window you are browsing doesn't have an appropriate Cancel function, please proceed with caution." However, no additional action would be taken by the web browser to minimize the risks as the command, once issue by the user, will be processed. Alternatively, the command is processed without alerting the user.

Figure 5:
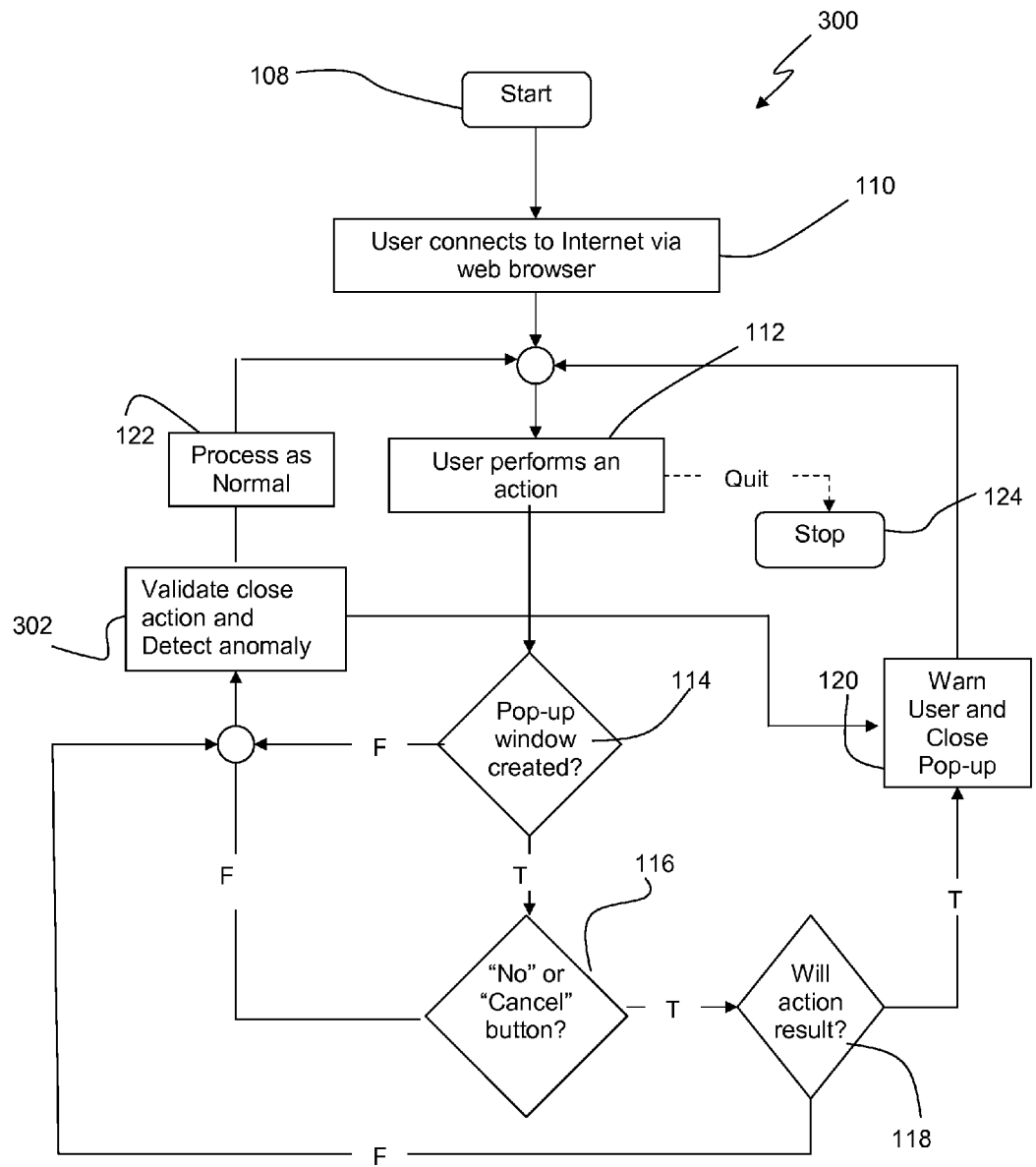
FIG. 5 is a flow chart illustrating an algorithm of another embodiment of the present invention.

FIG. 5 illustrates another embodiment of the present invention in which an algorithm 300 for validating the close action against the standard Operating System (OS) or web browser Application Program Interface (API) to close a window in the process flow is provided. The process flow from step 116 or step 118 to step 122 includes an additional step 302, which validates the close action issued by the command button against the OS of API in order to detect any anomaly. Where the command button to close the pop-up window does not call on the web browser API, this will be detected as an anomaly. The algorithm 300 will then initiate a warning message to the user and close the pop-up window automatically 120. This alternative step 302 can be applied independently as an alternative to the algorithms 100 or 200 set-out above or as a safeguard measure from any accidental selection of the spoofed command button. As a safeguard, this algorithm 300 can be implemented immediately before the logic step 122 to ensure that even where the command button does not appear to be spoofed, should the behavior of the follow-up actions not conform to an expected mode of operation, the user will be alerted and the pop-up window will be closed by the web browser immediately.

Therefore, what is needed is a method that enables web browsers to thwart button spoofing in pop-up advertisement windows. What is also needed is an executable system that can be added on to an existing internet web browser program to detect malicious code that would be executed when a user selects a spoofed command button provided as part of the pop-up window. What is further needed is an executable system that can forewarn a user of possible unintentional actions for selecting a spoofed command button on a pop-up window.

Figure 6:
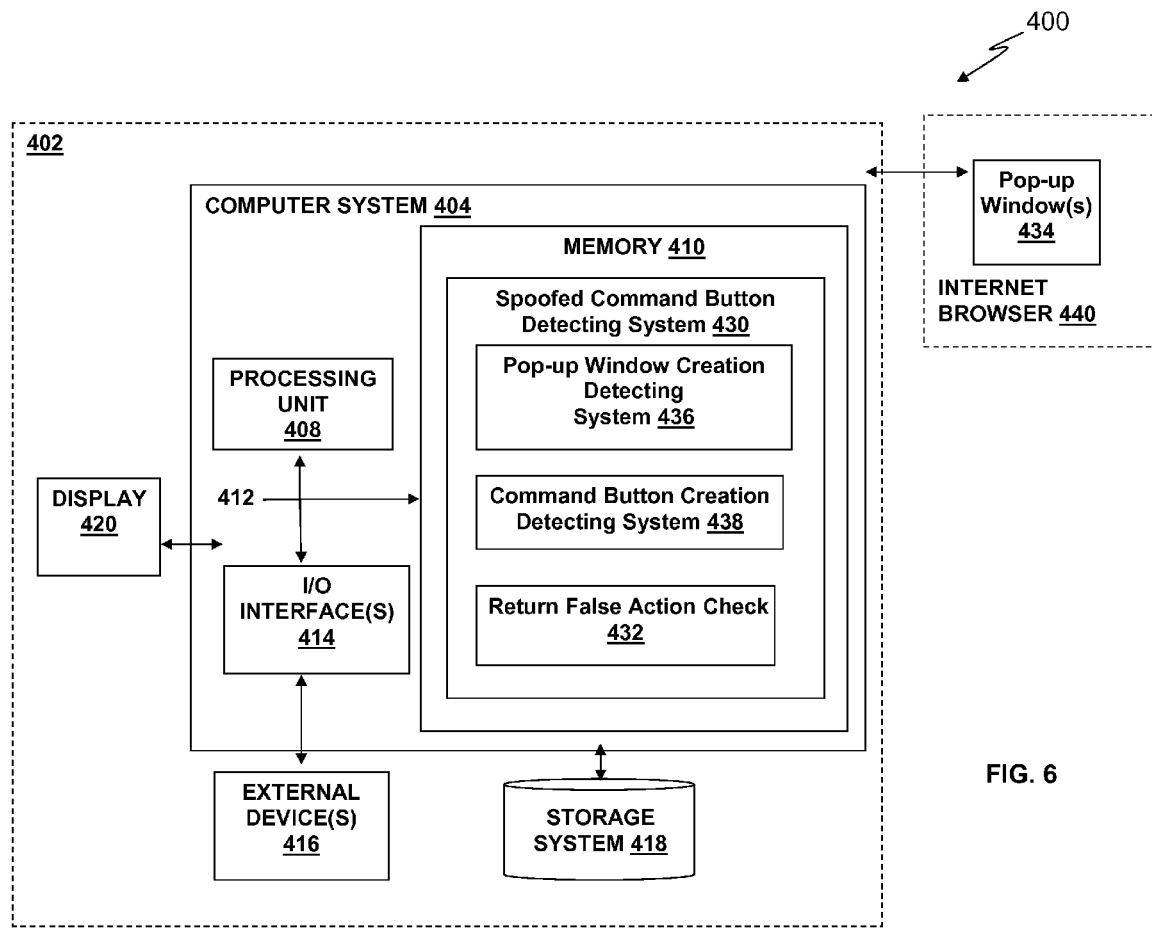
FIG. 6 depicts an illustrative computer system for implementing embodiment(s) of the present invention.

FIG. 6 shows an illustrative system 400 for detecting a spoofed command button in a pop-up window and forewarning a user of potential harm when selecting the spoofed command button in accordance with embodiment(s) of the present invention. To this extent, the system 400 includes a computer infrastructure 402 that can perform the various process steps described herein for detecting a spoofed command button. In particular, the computer infrastructure 402 is shown including a computer system 404 that comprises a spoofed command button detecting system 430, which enables the computer system 404 to detect the creation of a spoofed command button when a pop-up window is created by performing the process steps of the invention.

The computer system 404 as shown includes a processing unit 408, a memory 410, at least one input/output (I/O) interface 414, and a bus 412. Further, the computer system 404 is shown in communication with at least one external device 416 and a storage system 418. In general, the processing unit 408 executes computer program code, such as spoofed command button detecting system 430, that is stored in memory 410 and/or storage system 418. While executing computer program code, the processing unit 408 can read and/or write data from/to the memory 410, storage system 418, and/or I/O interface(s) 414. Bus 412 provides a communication link between each of the components in the computer system 404. The at least one external device 416 can comprise any device (e.g., display 420) that enables a user (not shown) to interact with the computer system 404 or any device that enables the computer system 404 to communicate with one or more other computer systems.

In any event, the computer system 404 can comprise any general purpose computing article of manufacture capable of executing computer program code installed by a user (e.g., a personal computer, server, handheld device, etc.). However, it is understood that the computer system 404 and spoofed command button detecting system 430 are only representative of various possible computer systems that may perform the various process steps of the invention. To this extent, in other embodiments, the computer system 404 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 402 is only illustrative of various types of computer infrastructures that can be used to implement the invention. For example, in one embodiment, the computer infrastructure 402 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the spoofed command button detecting system 430 enables the computer system 404 to perform a return false action check 432 when a command button of a pop-up window 434 is selected by the user. The pop-up window "popping-up" within a web browser 440. To this extent, the spoofed command button detecting system 430 is shown as including a pop-up window creation detecting system 436 for detecting the generation of a pop-up window 434 on the web browser 440, and a command button creation system 438 for performing a return false action check 432 for each command button in pop-up windows 434, based on the value assigned to the command button. Operation of each of these systems is discussed above. It is understood that some of the various systems shown in FIG. 6 can be implemented independently, combined, and/or stored in memory for one or more separate computer systems 404 that communicate over a network. Further, it is understood that some of the systems and/or functionality may not be implemented, or additional systems and/or functionality may be included as part of the system 400.

While shown and described herein as a method and system for detecting if command buttons in pop-up windows are spoofed, it is understood that the invention further provides various alternative embodiments. For example, in one embodiment, the invention provides a computer-readable medium that includes computer program code to enable a computer infrastructure to determine the follow-up action that will be triggered on selecting a command button of a pop-up window. To this extent, the computer-readable medium includes program code, such as the spoofed command button detecting system 430, which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 410 and/or storage system 418 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to determine if a pop-up window carries with it spoofed command buttons that may trigger malicious actions if a user selects the command button. In this case, the service provider can create, maintain, support, etc., a computer infrastructure, such as the computer infrastructure 402, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of detecting a spoofed command button of a pop-up window. In this case, a computer infrastructure, such as the computer infrastructure 402, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as the computer system 404, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic system/driver for a particular computing and/or I/O device, and the like.

Although the preferred embodiments of the present invention have been described herein, the above description is merely illustrative. It is not intended to be exhaustive or to limit the invention to the precise form disclosed, and obviously, many modifications and variations are possible. Further modification of the invention herein disclosed will occur to those skilled in the respective arts and all such modifications are deemed to be within the scope of the invention as defined by the appended claims.

What is claimed is:

1. A method for detecting a spoofed command button comprising:
    tracking a creation process for a pop-up window;
    detecting a command button created in the pop-up window;
    comparing an assigned value of the command button with a value assigned to at least one of a valid "No" or a valid "Cancel" button;
    determining a follow-up action generated on selection of the command button;
    verifying that the follow-up action generated closes the pop-up window; and
    alerting a user that the pop-up window poses a potential danger when the follow-up action from selecting the command button includes an action other than closing the pop-up window.

2. The method according to claim 1 wherein the detecting includes performing a background source code validation.

3. The method according to claim 1 further comprising alerting a user to proceed with caution when the assigned value of the command button restricts user selection.

4. A method for detecting a spoofed command button comprising:
- validating a closing action of a command button of a pop-up window against a web browser Application Program Interface (API) for closing a window, wherein the validating detects an anomaly when the command button does not call on the web browser API; and
- alerting a user in response to detecting the anomaly that a follow-up action generated in response to selecting the command button fails to communicate with the web browser API; and
- closing the pop-up window in response to detecting the anomaly.

5. A system comprising:
- at least one computing device configured for detecting a spoofed command button, comprising:
  - a component for tracking a creation process for a pop-up window;
  - a component for detecting creation of a command button in the pop-up window;
  - a component for comparing an assigned value of the command button with a value assigned to at least one of a valid "No" or a valid "Cancel" button;
  - a component for determining a follow-up action generated on selection of the command button;
  - a component for verifying that the follow-up action generated closes the pop-up window; and
  - a component for alerting a user that the pop-up window poses a potential danger when the follow-up action performs an action other than closing the pop-up window.

6. The system of claim 5, wherein the component for detecting performs a background source code validation.

7. The system of claim 5 further comprising a component for alerting the user to proceed with caution when the assigned value of the command button restricts user selection.

8. The system of claim 5 further comprising
- a component for validating the pop-up window against a web browser Application Program Interface (API) for closing a window;
- a component for alerting the user on detecting the follow-up action generated by the user on selecting the command button omits communicating with the web browser API; and
- a component for closing the pop-up window.

9. A computer program stored on a non-transitory machine-readable storage medium, for detecting a spoofed command button, the computer program including program code for:
- tracking a creation process for a pop-up window;
- detecting a command button created in the pop-up window;
- comparing an assigned value of the command button with a value assigned to at least one of a valid "No" or a valid "Cancel" button;
- determining a follow-up action generated on selection of the command button;
- program code for verifying that the follow-up action generated closes the pop-up window; and
- program code for alerting the user that the pop-up window poses a potential danger when the follow-up action for selecting a command button includes an action other than closing the pop-up window.

10. The computer program of claim 9 further including program code for:
- validating a closing action of the pop-up window against a web browser Application Program Interface (API) for closing a window;
- alerting a user on detecting that the follow-up action generated by the user on selecting the command button fails to communicate with the web browser API; and
- closing of the pop-up window.

11. The computer program of claim 9 further including program code for performing a background source code validation when the command button is detected.

12. The computer program of claim 9 further including program code for alerting the user to proceed with caution when the assigned value of the command button restricts user selection.

13. A method for deploying an application for detecting a spoofed command button, the method comprising:
- providing a computer infrastructure being operable to:
- track a pop-up window creation process;
- detect a command button created in the pop-up window;
- compare an assigned value of the command button with a value assigned to at least one of a valid "No" or a valid "Cancel" button;
- determine a follow-up action generated on selection of the command button;
- verify that the follow-up action generated closes the pop-up window; and
- alert a user that the pop-up window poses a potential danger when the follow-up action from selecting the command button includes an action other than closing the pop-up window.

* * * * *